April 2, 1968     L. BALAMUTH     3,376,179
METHOD AND APPARATUS FOR HIGH FREQUENCY JOINING OR
SEALING OF THERMOSOFTENING MATERIALS
Filed June 12, 1964     4 Sheets-Sheet 1

INVENTOR
LEWIS BALAMUTH
BY
ATTORNEY

INVENTOR
LEWIS BALAMUTH
BY
ATTORNEY

April 2, 1968 L. BALAMUTH 3,376,179
METHOD AND APPARATUS FOR HIGH FREQUENCY JOINING OR
SEALING OF THERMOSOFTENING MATERIALS
Filed June 12, 1964 4 Sheets-Sheet 3
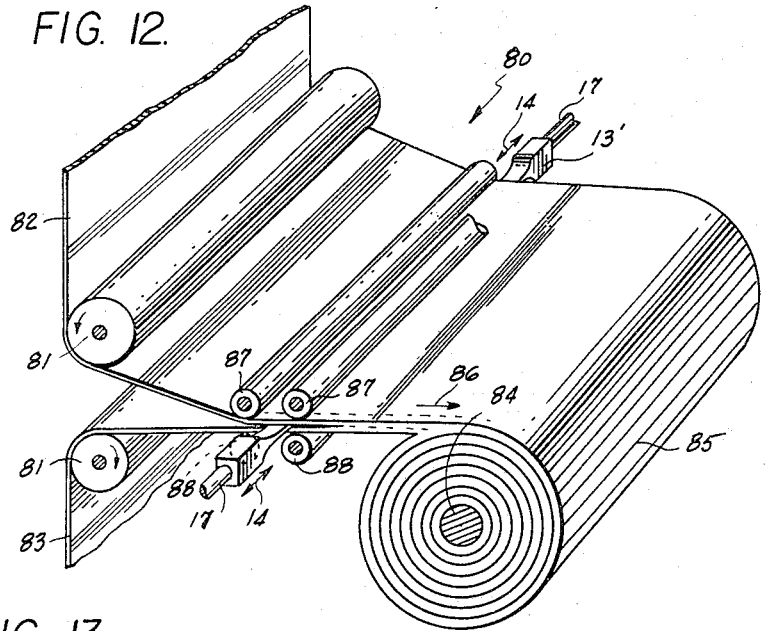
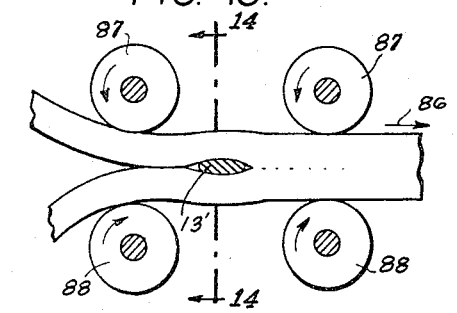
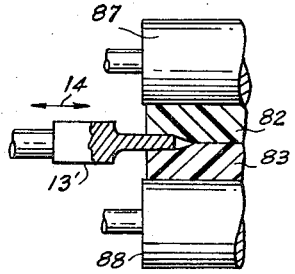
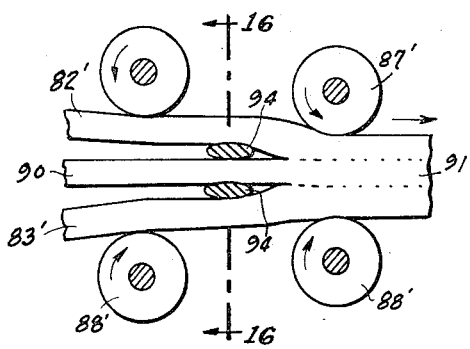
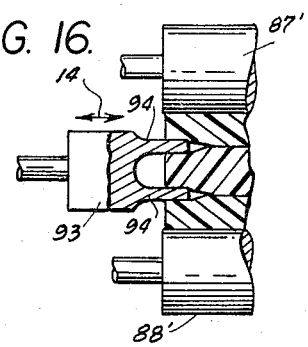
INVENTOR
LEWIS BALAMUTH
BY
ATTORNEY April 2, 1968 L. BALAMUTH 3,376,179
METHOD AND APPARATUS FOR HIGH FREQUENCY JOINING OR
SEALING OF THERMOSOFTENING MATERIALS
Filed June 12, 1964 4 Sheets-Sheet 4
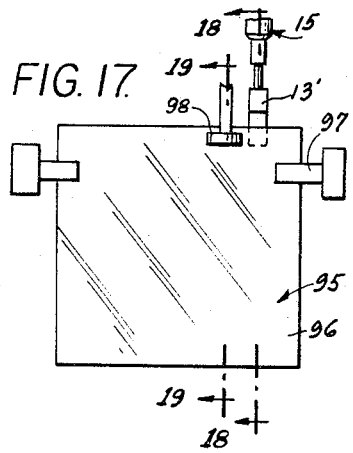
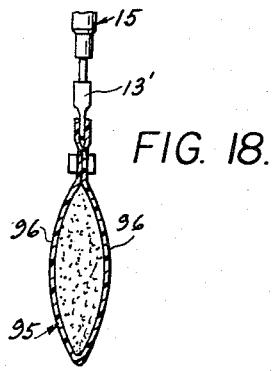
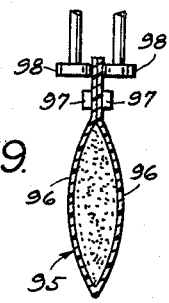
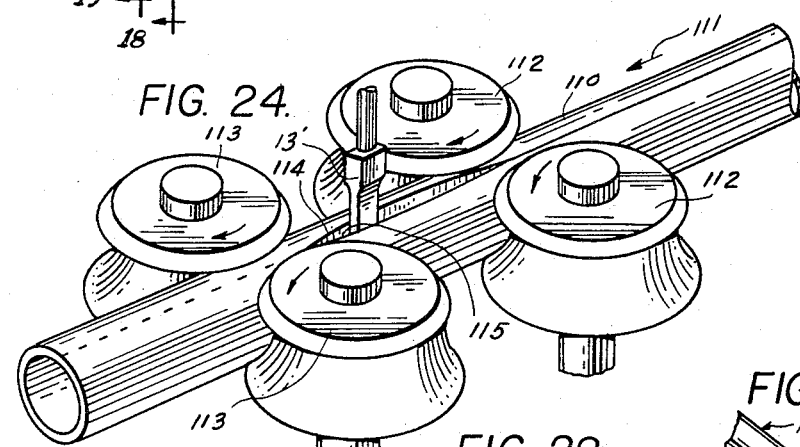
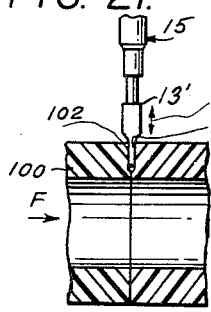
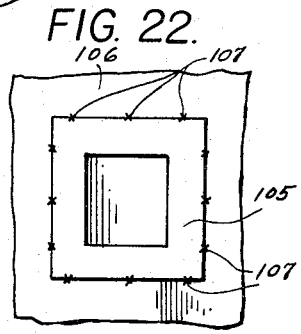
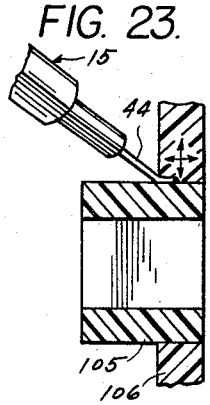
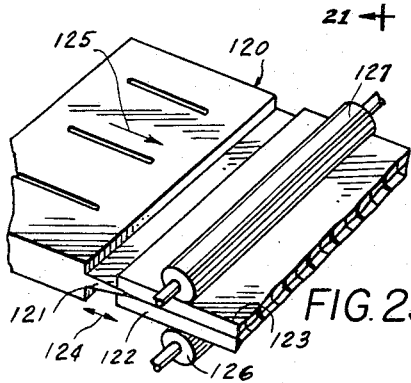
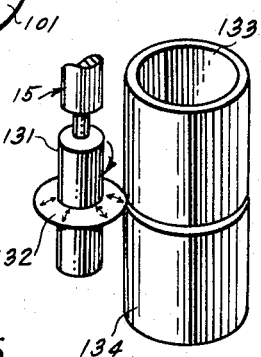
INVENTOR
LEWIS BALAMUTH
BY
ATTORNEY 3,376,179
METHOD AND APPARATUS FOR HIGH FREQUENCY JOINING OR SEALING OF THERMOSOFTENING MATERIALS
Lewis Balamuth, New York, N.Y., assignor to Cavitron Ultrasonics Inc., Long Island City, N.Y., a corporation of New York
Filed June 12, 1964, Ser. No. 374,701
18 Claims. (Cl. 156—73)

ABSTRACT OF THE DISCLOSURE

Normally solid materials, at least one of which is thermosoftening and thus a poor transmitter of shear vibrations, are joined together by placing surfaces of the materials to be joined in close proximity to each other, applying high frequency mechanical vibrations directly to the surfaces in close proximity to each other, as by a tool interposed therebetween and being vibrated at a high frequency and with a small amplitude, which vibrations have major components of motion in directions parallel to such surfaces so as to exert a rubbing action thereon which heats and, hence, softens the thermosoftening material substantially only at its contacted surface, whereupon the tool is withdrawn from between the surfaces which are pressed together until the softened material solidifies to provide a firm bond therebetween.

---

This invention relates to the permanent joining of similar or dissimilar materials by the application of elastic vibratory energy.

It has already been proposed, for example, in the copending application for U.S. Letters Patent, Ser. No. 228,803, filed Oct. 8, 1962, now Patent 3,321,558 and assigned to the present assignee, and wherein the applicant is a co-invention, to effect vibration of a tool member at a high frequency and minute amplitude while the tool member is placed in rubbing motion contact with a frictional member for the purpose of heating the tool member. However, what has not been appreciated in the above identified application are the starting and novel possibilities and advantages which arise when the vibratory tool and the work alone, rather than a separate frictional member, are involved in the heating effects.

In sealing thermoplastic sheets or bodies together, several methods employing mechanical high frequency vibrations are known. Ordinarily, the sealing of plastic sheet material is effected by placing the sheets in overlapping relation on a work-bed or anvil-like surface, pressing a high frequency, low amplitude vibrating tool against the outer sheet surface facing away from the work-bed in such a manner that the vibrations are directed perpendicular to the planes of the plastic sheets, and continuing to thus press the tool against the sheets for a time sufficient to cause the inner, adjacent surfaces of the two plastic sheets to join. It is clear that, in this case, the energy for effecting the joining operation, must first be transmitted through at least one of the sheets before it can be absorbed and do its work at the joining site. By reason of the foregoing, this method has the disadvantages of relatively large power requirements due to absorption of energy in transmisison through the sheet or sheets. Further, if the plastic material is elastomeric, the thicknesses that can be joined by this method are limited.

Now, the applicant first felt that, by merely changing the direction of the vibrations from that perpendicular to the sheet surfaces to a direction parallel to the latter, large amounts of frictional heat would be generated and thereby produce a satisfactory joint at the interface. In fact, that is precisely the way in which ultrasonic welding of metal sheets is performed, for example, as described in U.S. Letters Patent Nos. 3,051,027; 3,053,124; 3,053,125 and 3,088,343, in each of which applicant is a co-inventor. However, thermosoftening plastic materials, contrary to the behavior of metals, do not readily transmit shear vibrations. Thus, if vibrations parallel to the planes of the overlapped plastic sheets are applied to an outer or upper surface of the latter, practically all the heat is generated at the upper surface of the plastic sheet, which surface is not in contact with the adjacent sheet to which joining is desired. Hence, the upper or outer surface of the plastic melts, but due to the poor heat conducting characteristics of the plastic material, as well as the poor shear wave transmission therethrough, the melting of the upper or outer surface of one sheet does not influence the area of contact of that sheet with the other sheet so that sealing or joining of the sheets is not affected.

Accordingly, it is an object of this invention to provide a method for joining materials, at least one of which is thermosoftening, through the use of high frequency vibrations, and which is not limited with respect to shapes or thicknesses of the objects to be joined.

Another object is to provide a method of the described character having relatively low power requirements.

A further object is to provide a method for joining materials through the use of high frequency or ultrasonic vibrations, and which is operative even when one or both of the materials to be joined has little or not ability to transmit such vibrations therethrough.

In accordance with an aspect of the present invention, the surfaces of the materials to be joined are positioned in close proximity to each other, particularly at the area or zone where they are to be joined, and ultrasonic energy is applied directly to such surfaces, whereupon the surfaces are pressed or held against each other.

The vibrations are preferably applied to the surfaces to be joined by a tool having opposed, flat parallel surfaces with the vibrations having significant components in the planes of such tool surfaces. The tool is inserted in the areas of mutual contact of the surfaces to be joined, so that both areas are in rubbing relation with the tool at the same time. Now, independently of the thickness of either of the objects to be joined, the surface or surfaces of the thermosoftening object or objects will rapidly soften and may be melted, if desired. In order to complete the joining of the objects, the tool is withdrawn upon performing its heating function, and positive pressure is used to either keep or force the surfaces together until the hardened joint is made.

It will be noted that this method of joining in accordance with the invention, takes advantage of two basic characteristics of thermoplastic, poor heat-conducting materials, which characteristics seriously impede the joining of such materials by other methods. One characteristic is the heat generation due to the rubbing contacts of a high frequency, minute amplitude vibrator, and the other characteristic is the high absorption coefficient of such materials for shear waves. When the vibratory energy is introduced by rubbing at the outer surfaces of the objects to be joined, as previously proposed, the rubbing produces shear waves which stay at the rubbing site and insufficient energy gets to the site of the desired joint between the inner or confronting surfaces. Further, the heat generation due to rubbing merely melts the outer surfaces, and such heat is not efficiently transmitted to the surfaces to be joined.

In accordance with one embodiment of this invention, the above described method is used for joining thin plastic film. In this case, as before, the introduction of vibratory energy or rubbing occurs only at surfaces to be joined, and again, both friction and shear wave absorption cooperate to keep the film surfaces to be joined in a softened state, while the outer surfaces remains smooth and clean.

When the plastic film is very thin, it is important that the means for producing the positive pressure holding the films in contact with the tool be of thermally non-conducting materials so as not to bleed-off heat energy too rapidly as it is being generated. Further, because of this, it is preferable to arrange the thin sheets or films relative to the rubbing tool, so that softening of the confronting surfaces of the films occurs before the films are contacted by the elements by which the softened surfaces are pressed against each other. In this type of arrangement, it is desirable that the elements engaging the films to press the softened surfaces against each other be effective to remove heat. Although it is advantageous to retain all softening energy at the plastic film surface during softening thereof, nevertheless, after softening or melting, it is desirable to restore the film to room temperature as rapidly as possible so as to maintain the strength of the film. This is an important practical consideration when the film is thin and it is desired to seal it at high speed, as the upper limit of speed is really determined by the strength of the film at its weakest moment, and the described arrangement serves to reduce the time during which the film is weakened to the briefest possible time for effecting the softening necessary for joining.

The joining of thin film continuously at speeds hitherto not possible is only one of the many advantageous applications of the method embodying this invention. For example, heavy conduit pipe or thick plates of thermosoftening material can be very advantageously joined by the described method. Since the tool introduces the softening energy only where it is needed directly at the mutually contacting surfaces to be joined, the energy required per unit area of joining is held to a minimum. Also, the size of the tool is determined by the area to be joined and not by the solid, volumetric structure of the objects to be joined. As a result, it becomes possible to use low power, quite small tools for joining large structures.

In the case of home consumer items, such as plastic spectacle frames, plastic model kits and the like, the objects are not large and the surfaces to be joined are small, so that the tool may be so simplified and miniaturized as to be very inexpensive and thus attractive for use by hobbyists and the like.

Thus, the method disclosed herein may be employed in the assembling of a plastic car, boat, rain or other models of the type that have found acceptance with the public. When such models are assembled with glue or adhesive, care must be taken to avoid smearing or flow of excess glue which results in the marring of the visible surfaces of the model. In addition to the "sloppy" appearance that results, there is the deleterious odor associated with almost all commercially available glues for use with plastics at the present time. By the use of a vibratory tool to assemble plastic models in accordance with this invention, it is possible to avoid the foregoing disadvantages and a clean, neat, assembled model is easily obtainable. Since the vibrated tool remains at room temperature when not in contact with the plastic, it avoids the fire hazards associated with the use of heated tools, for example, soldering irons, for melting and joining plastics.

The above, and other objects, features and advantages of the invention, will be apparent in the following detailed description of illustrative embodiments thereof which is to be read in connection with the accompanying drawings forming a part hereof and wherein:

FIG. 12 is a perspective view of a vibratory device for sealing sheet-like materials on a continuous basis in accordance with this invention;

FIG. 13 is an enlarged detail sectional view illustrating the operation of the device of FIG. 12;

FIG. 14 is a sectional view taken along the line 14—14 on FIG. 13;

FIG. 15 is a view similar to that of FIG. 13, but showing a device for simultaneously sealing or joining three webs or sheets;

FIG. 16 is a sectional view taken along the line 16—16 on FIG. 15;

FIG. 17 is an elevational view showing the sealing or closing of a plastic bag in accordance with this invention;

FIGS. 18 and 19 are sectional views taken along the lines 18—18 and 19—19, respectively, on FIG. 17;

FIG. 20 is an end elevational view illustrating the joining of thermoplastic pipes in accordance with this invention;

FIG. 21 is a sectional view taken along the line 21—21 on FIG. 20;

FIGS. 22 and 23 are respectively end elevational and scetional views of the joining of rigid thermoplastic bodies with a bi-directional tool in accordance with this invention;

FIG. 24 is a diagrammatic perspective view illustrating a vibratory device operating in accordance with the principles of the invention for forming plastic tubing from thermoplastic sheet material;

FIG. 25 is a diagrammatic perspective view illustrating a vibratory device suitable for use in accordance with the present invention for sealing or joining larger surfaces at one time; and FIG. 26 is a perspective view of another embodiment of the invention having a rotary vibrator and adapted to join together thermoplastic pipes.

Figure 1:
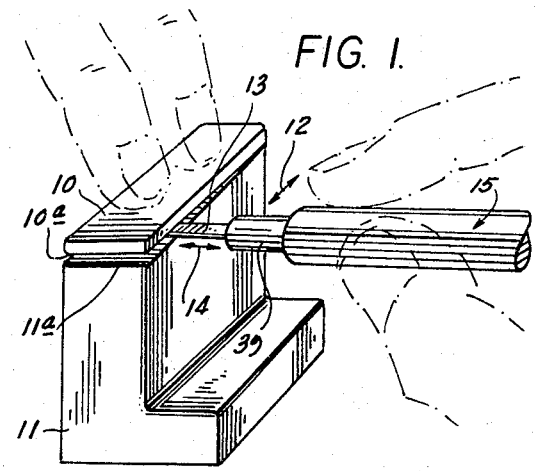
FIG. 1 is a diagrammatic perspective view illustrating the joining of thermoplastic members having flat surfaces in accordance with the invention.
Figure 2:
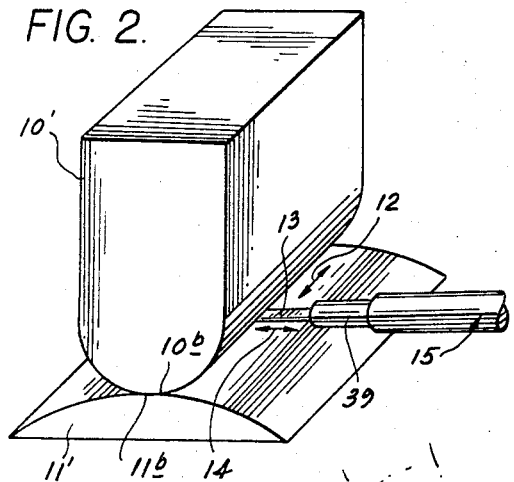
FIG. 2 is a diagrammatic perspective view similar to FIG. 1, but in which the surfaces to be joined are both of contoured configuration.
Figure 3:
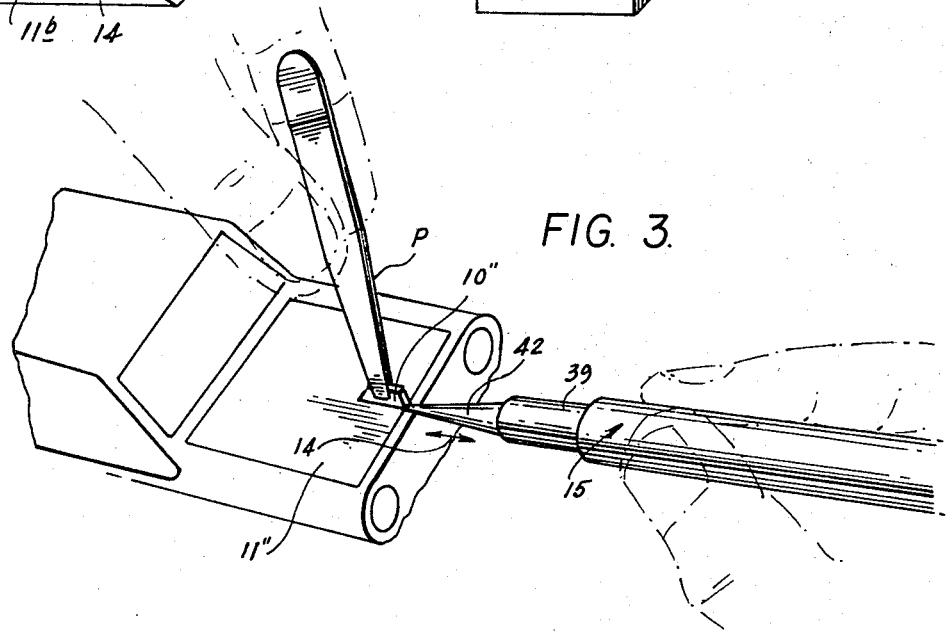
FIG. 3 is a diagrammatic perspective view of the joining of two thermoplastic members with a needle-like vibratory tool.

Referring to the drawings in detail and initially to FIGS. 1, 2 and 3, thereof, it will be seen that, the solid parts to be joined may be of any thermoplastic or thermosoftening material or materials, capable of coalescing to form a bond therebetween. It will be understood, that only one of the materials need be of this character, the other rigid part or sheet, for example, being of a porous material into which the fusible material will penetrate. However, in the explanation to follow, it will be assumed that the method of bonding to be hereinafter described is being employed with plastic materials.

In FIG. 1, there is illustrated the joining of a plastic cap or lid 10 to a plastic L-shaped member 11 in accordance with the process of the present invention. The plane lower surface 10a of cap 10 is positioned in contact or in close proximity to the plane upper surface 11a of the L-shaped member 11 so as to permit the application of high frequency mechanical vibrations to the surfaces to be joined.

The vibrations for effecting a rubbing action on the surfaces 10a and 11a to be joined are preferably applied through a tool 13 of suitable configuration which is vibrated longitudinally, as represented by the arrows 14 (FIGS. 1, 2 and 3). Where a seam weld is desired, the tool 13 is wiped or moved along the surfaces 10a and 11a in the direction represented by the arrow 12 on FIGS. 1 and 2, that is, the tool is caused to move in a direction that extends at right angles to the longitudinal vibrations of the tool.

The tool 13 preferably has a thin spatula-like shape and is made to vibrate at a high frequency and with a minute amplitude of vibration. Such vibrations have a significant component in the plane of the spatula-like tool surface. The tool 13 is inserted between cap 10 and member 11 so as to have an area of mutual contact with both surfaces 10a and 11a simultaneously. The rubbing contact of the vibrated tool with both surfaces 10a and 11a almost instantly causes the surfaces to be softened and motion of the tool 13 in the direction of arrow 12 is maintained. As the surfaces 10a and 11a are progressively softened, positive pressure may be maintained, by the user's hand or by some other mechanical means (not shown), so as to press together the softened surfaces. This pressure is maintained for a sufficient time to keep or force the surfaces together until a hardened joint is produced.

The vibrations necessary to achieve the foregoing have a frequency within the range between 1,000 and 100,000 cycles per second, and an amplitude within the range of .0001 to .025 inch so as to provide high peak accelerations.

Figure 4:
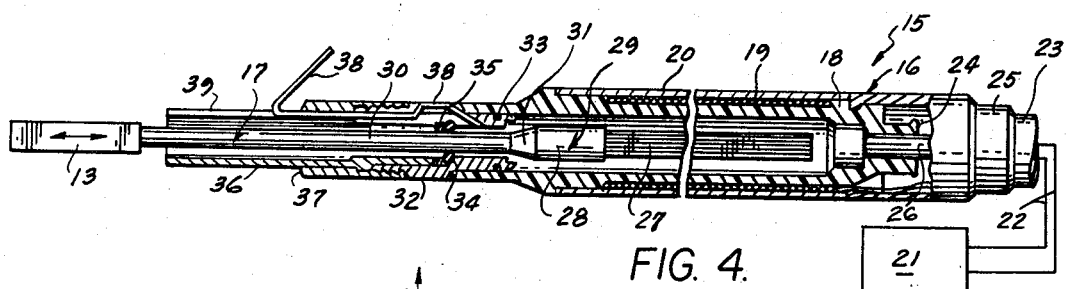
FIG. 4 is a side elevational view, partly broken away and in axial section, of an acoustically vibrated material treating device having one form of tool connected thereto for use in connection with this invention.
Figure 5:
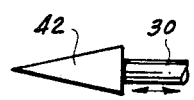
FIG. 5 is a detail view of another tool that can be used in accordance with the invention.

As shown in FIG. 4, the device 15 for effecting the necessary high frequency vibrations of the tool 13 may be of the type disclosed fully in U.S. Letters Patent No. 3,076,904 assigned to the present assignee. Such a device is in the form of a hand-piece generally comprising a tubular housing 16 into which an insert unit 17 supporting the tool 13 may be partially telescoped. The housing 16 includes a tubular casing 18 preferably formed of molded plastic, such as, nylon or the like, and having a winding 19 of current conducting wire wound on the outside of casing 18 and enclosed and protected by an outer jacket 20 which may be formed of extruded plastic tubing. The plastic material of casing 18 does not impede the establishment of an alternating electromagnetic field within the tubular casing upon excitation of the exterior winding or coil 19 by a biased alternating current supplied to the latter from a suitable generator 21 by way of wire leads 22 housed in a protective flexible conduit 23. Conduit 23 is connected to a nipple portion 24 at one end of casing 18 by an adaptor 25. Conduit 23 also contains a tube 26 by which a coolant may be supplied through nipple 24 to the interior of casing 18.

The insert unit 17 is shown made up of a mechanical vibrator that includes a transducer 27 designed to be telescoped within casing 18 with winding 19 in surrounding relation thereto. The transducer 27 may be any one of a number of electro-mechanical types, such as, electrodynamic, piezo- electric or magnetostrictive, however, for the operating range of frequencies most desirable for the purposes of the present invention, transducer 27 is preferably of the magnetostrictive type. The magnetostrictive transducer 27 is formed of a metal, such as, Permendur, Permanickel, nickel, or other metals which have high tensile strength and are highly magnetostrictive in character, so that it will vibrate to a maximum degree when subjected to the influence of the alternating electromagnetic field established by the biassed alternating current supplied to winding 19. As shown in FIG. 4, transducer 27 may comprise a stack of strips of the selected magnetostrictive metal secured together at one end, while the other end of the transducer is rigidy fixed, as by brazing solder, to a head 28 of an acoustic impedance transformer generally identified by the reference numeral 29 and also forming part of the mechanical vibrator.

The acoustic impedance transformer or connecting body 29 may be made of a strong metal, such as, steel, Monel metal, titanium. Phosphor-bronze, brass or beryllium copper, and further includes a stem 30 integrally joined to the head 28 by a tapered neck 31 and having a length which is selected so that the end of stem 30 projects out of housing 16 when insert unit 17 is in assembled relationship with the latter. The removable insert unit 17 further includes a tubular retainer 32 extending loosely around stem 30 and having a reduced diameter neck dimensioned to telescope snugly into the open end of casing 18. A sealing ring 33 is set within a groove extending around the reduced neck of retainer 32 to provide a liquid seal between the retainer and casing 18. A second resilient ring 34 fits snugly around stem 30 and is driven axially into abutment against an internal shoulder of retainer 32 by a metal ring 35 which fits loosely over stem 30. The portion of stem 30 extending beyond retainer 32 may be protected by a guard member 36 having a throat telescoping snugly into retainer 32 and thus supported by the latter. The protective guard member 36 is held in assembled relation to retainer 32 by means of a sleeve 37 engaging an external shoulder on the guard member and having a threaded connection with the retainer so that, when sleeve 37 is tightened on retainer 32, guard member 36 is drawn axially into retainer 32 and acts, at its inner end edge, against metal ring 35 which is thereby pressed against resilient ring 34 for radially expanding the latter. The ring 34 provides a fluid seal between stem 30 and the bore of retainer 32, and additionally provides the sole support for the mechanical vibrator formed by transformer 29 and transducer 27 at approximately a node of the longitudinal movement thereof so that the vibrations of high frequency and low amplitude are not dampened or transmitted to the housing.

It will be apparent that the entire insert unit 17 may be disconnected from housing 16 by merely exerting an outward pull thereon sufficient to withdraw the reduced neck and associated sealing ring 33 of retainer 32 from the open end portion of casing 18. The entire insert unit may likewise be attached to the housing in a leak-proof manner merely by telescoping the reduced neck and sealing ring 33 of retainer 32 into the end portion of casing 18. Thus, interchangeable insert units constructed in the above described manner and equipped with tools of different kinds and shapes, as hereinafter described in detail, can be quickly applied and removed from the housing to adapt the device 15 for use in the sealing or joining of various kinds of thermosoftening objects in accordance with the invention.

Since the transducer 27 is subjected to heating after prolonged operation and most effectively serves its purpose when maintained in relatively cool condition, the flow of cooling fluid, such as, water or cold air, from tube 23 is directed into the interior of casing 18 containing the transducer, and such flow of cooling fluid also maintains the outer jacket 20 at approximately room temperature so that it can be comfortably grasped. The cooling fluid supplied to the interior of casing 18 is permitted to bleed into the bore of retainer 32.

The transducer 27 and transformer 29 are longitudinally dimensioned so as to have lengths which are whole multiples of half-wavelengths of the compressional waves established therein at the frequency of the biassed alternating current supplied to winding 19 so that longitudinal loops of motion occur both at the connection between the transducer and transformer and at the end of the transformer stem 30 to which the tool 13 is rigidly connected. Thus, the optimum amplitude of longitudinal vibration of tool 13 is achieved, and such amplitude is determined by the relationship of the masses of the head 28 and stem 30 of the transformer which may be made effective to either magnify or reduce the amplitude of the vibrations received from the transducer.

The tool 13 may be in the form of a relatively thin, flat, metal strip, as shown on FIGS. 1 and 2, thereby to provide relatively wide surface areas for contact with the surfaces to which the vibrations are to be applied for effecting a softening of said surfaces. The tool 13 may be permanently attached to the end of stem 30, for example, by brazing solder or the like, or the tool may be provided with a threaded stud (not shown) adapted to be screwed into a tapped hole in the end of stem 30 for effecting the rigid connection of the tool to the stem.

The speed at which the tool 13 is moved in the direction of arrow 12 transversely across the member 11 is dependent upon the specific plastics being sealed as well as the area of the seal. For example, the tool 13 may extend across the entire width of surface 11a to thereby obtain a bonding of surfaces 10a and 11a over their respective areas. Alternatively, the tool 13 may be inserted a mere sixteenth of inch between surfaces 10a and 11a to affect a seal of such width, and the tool 13 can then be moved along the entire circumferences of surfaces 10a and 11a thereby essentially sealing the two mating parts 10 and 11 at their peripheral edges.

In FIG. 1, the surfaces 10a and 10b are flat or plane, and thus can contact, and be joined over their entire areas. However, as shown on FIG. 2, the described method can also be used where the surfaces to be joined only have line contact with each other. As in the case of the method described with reference to FIG. 1, the tool 13 in FIG. 2 is moved transversely across the parts 10' and 11' which are to be joined at their respective mating surfaces 10b and 11b. Both members to be joined have a substantial thickness in the plane perpendicular to the plane of vibratory motion of the tool 13 of handpiece 15 which again may be hand-held by the user. The strength of the resultant bond is sufficient to retain the component parts 10' and 11' in the position illustrated and such bond may be formed along the entire line of contact to obtain a seam weld or the tool 13 may be used to spot weld the parts together.

The described method of sealing or joining has made it possible to seal relatively large massive thermoplastic bodies with vibratory tools powered by a generator in the 5 to 30 watt range. The reason for this is that the softening energy is directly introduced by the tool only where it is needed, that is, at the mutually contacting surfaces to be joined, and therefore the energy required per unit area of joining is held to a minimum. The power requirement and size of the tool are not determined by the volumetric structure of the objects to be joined, but rather depend only upon the surface are to be joined.

When the upper member 10' to be joined is of a sufficient mass, the weight of such mass may be utilized as the means exerting the pressure for maintaining intimate contact between the component parts 10' and 11' at the line of contact of surfaces 10b and 11b, respectively.

FIG. 3 illustrates the use of the method embodying the invention in the assembling of a plastic model, for example, in securing the hood ornament 10'' to the hood surface 11' of a car model. In view of the small size of the ornament 10'', it is not always necessary that the complete surfaces of the mating parts be joined, and spot or tack welding of the parts may be sufficient. Such spot welding is accomplished by the use of a vibratory tool 42'' preferably having a needle-like shape to permit tacking of the two surfaces at selected points around the periphery of the hood ornament. When one or both of the parts to be joined are in the miniature or micro-miniature range, a tweezer P or some other means may be employed to keep the components in position and in contact with each other at their respective mating surfaces. Point sealing is accomplished by inserting the vibratory tip 42 in the general direction of arrow 14 between the surfaces to be joined. Melting of the thermoplastic surfaces occurs permitting penetration of the vibratory tool with a minimum of static force. As the plastic material is made to flow, positive pressure is maintained by the use of the tweezers P and the vibratory tool 42 is removed to permit the plastic material to solidify whereupon a secure weld is formed. After the tool 42 has been removed from contact with the spot weld and while the plastic is in the process of solidifying, the next spot weld may be commenced anywhere from a sixteenth to an eighth of an inch away. The closeness of the spot welds will be dependent upon the size of the members being joined and the strength requirements of the joint.

It has been found that, in order to avoid or minimize adhesion of the softened plastic to the vibratory tool, a fine surface finish should be provided on each tool.

One of the advantages of the use of the described method embodying the invention is its ability to seal, unseal and then reseal the initial seal innumerable times. For example, in the field of printed circuits, a completed circuit is usually preconstructed on a printed circuit board and a series of such boards are rigidly secured to each other. Care must be taken in joining such boards to avoid any excessive temperature increases for fear of damaging the components secured to the board. A series or series of these boards 43 are shown on FIG. 7 with the vibratory unit 15 having its tool 13 interposed between a pair of the boards. Spot or seam seals may be obtained in the manner explained with reference to FIGS. 1, 2 and 3. By using a hand-held instrument, a repairman can easily disassemble a stack of the boards and replace the damaged one in the field without any difficulty.

Although the method of joining thermoplastic materials, as illustrated in FIGS. 1, 2 and 3, employs a hand-held vibrator assembly 15, it is obvious that the method may also be applied to the formation of a continuous seal or seam extending parallel to the direction of movement of one or more plates, webs, sheets or films of thermoplastic material.

Figures 7, 8, 9, 10, 11:
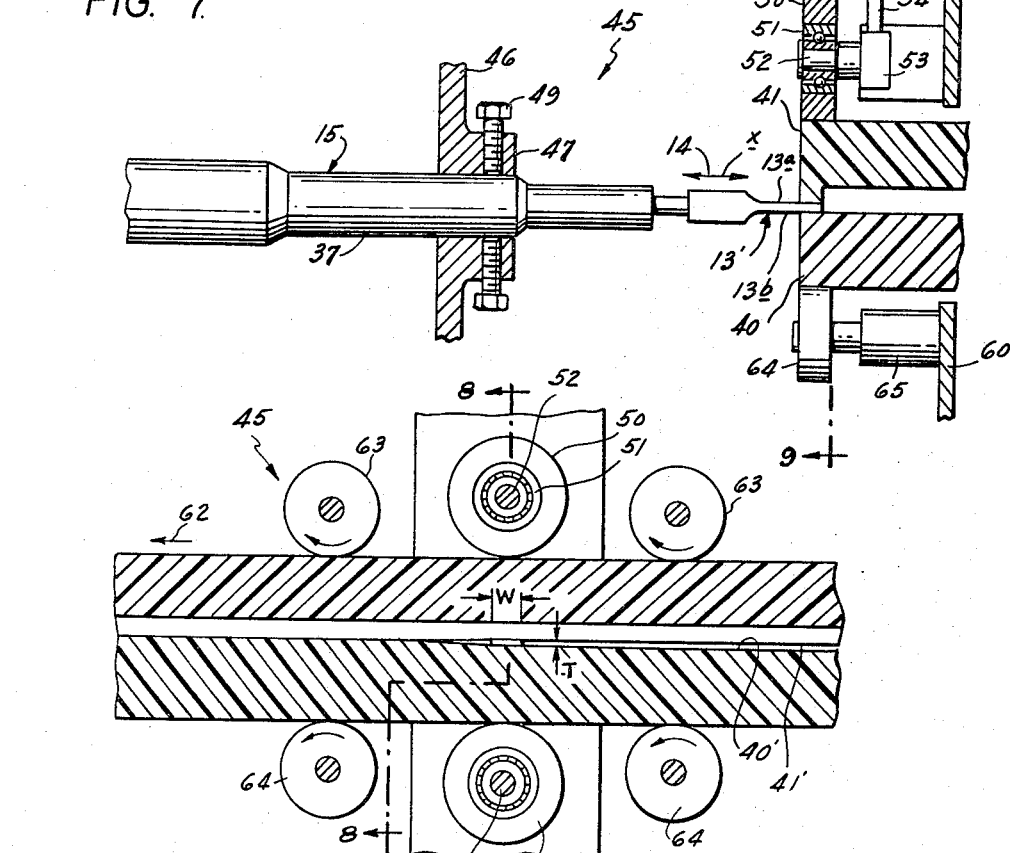
FIG. 7 is an elevational view illustrating the use of the invention for assembling and disassembling elements, for example, a series of transistor boards.
FIG. 8 is a sectional view of an ultrasonic seam welding apparatus embodying this invention, which view is taken along the line 8—8 on FIG. 9.
FIG. 9 is a sectional view taken along the line 9—9 on FIG. 8.
FIG. 10 is an elevational view, partly broken away and in section, illustrating the joining of the shell of a container to an end cap in accordance with the present invention.
FIG. 11 is a fragmentary view similar to a portion of FIG. 10, but showing the joining of the shell to an end cap in a modified form of container.

Referring to FIGS. 8 and 9, it will be seen that an ultrasonic seam welding apparatus embodying the present invention, and there generally identified by the reference numeral 45, may comprise at least one mechanical vibrator assembly 15 having a transducer therein (not shown). The transducer may be any one of a number of electromechanical types, such as, electrodynamic, piezoelectric or magnetostrictive. A suitable transducer of magnetostrictive design may be of the type described above with reference to FIG. 4.

The mechanical vibrator 15 is non-rotatably mounted on a frame 46, for example, by a circular flange 47 having a clearance bore 48 for accommodating the sleeve 37 and a series of lock screws 49 extending radially in flange 47 and against the sleeve 37 to secure the mechanical vibrator 15 in adjusted position. The mechanical vibrator 15 is preferably disposed with its longitudinal axis extending horizontally so that the vibrations $x$, in the direction of the arrow 14, at the free end portion of welding element or tool 13', are disposed in a horizontal plane.

The plastic plates 40 and 41 to be seam welded together are subjected to a static pressure or vertically clamped between a pair of back-up rollers 50 each mounted rotatably by a ball bearing or other anti-friction bearing 51, on an axle 52 for rotation about a horizontal axis extending parallel to the longitudinal axis of mechanical vibrator 15. In order to apply the necessary static or clamping pressure, the upper axle 52 extends from a head 53 on a rod 54 secured to a piston movable within a cylinder 55 mounted on a suitable frame structure 60 and to which fluid under pressure, for example, compressed air, is supplied through a conduit 61 for urging the upper roller 50 downwardly toward the lower roller 50 with the welding element 13' therebetween.

The static or clamping pressure or force exerted on the plates 40 and 41 between rollers 50 should be sufficient to hold together the plates in the joint area during the introduction of elastic vibratory energy, and may be in the range between approximately 1 and 500 pounds. The frequency of the vibrations $x$ at the free end portion of welding element 13′ may be in the range from 1 to 100 kilocycles per second, and preferably in the range from 10 to 80 kilocycles per second, while amplitude of the vibrations is selected within the range from approximately .001 to .025 inch so as to ensure the introduction of vibratory energy sufficient to cause the plastic surfaces in the immediate area of the tool 13′ to become softened and tacky thereby permitting a proper bond of the plastic surfaces to result.

It has been found that, by reason of the vibrations $x$ in the horizontal plane, that is, in a plane perpendicular to the direction of the static or clamping pressure or force, the frictional resistance of the welding tool or element 13′ to movement of the engaged plates 40 and 41 is very substantially reduced. A possible explanation of this observed phenomenon is is that the extremely high acceleration of the surfaces of welding tool or element 13′ resulting from the vibrations $x$ causes only a relatively small sliding friction to be present between the engaged plates 40 and 41 and the welding element. Thus, even though the welding tool or element 13′ is stationary and may have square, rectangular or oval cross-sections, the plates 40 and 41 are nevertheless easily displaceable between the rollers 50 and the tool 13, for example, in the direction of the arrow 62 on FIG. 9, thereby to successively subject the overlapped edge portions of the plates 40 and 41 to the welding action in the zone between the back-up rollers 50, and thus provide a continuous weld seam. The displacement of the plates 40 and 41 between welding element 13′ and rollers 50 can be conveniently effected by pairs of upper and lower feed rollers 63 and 64, respectively, engageable, from above and below, with the overlapped edge portions of the plates at the opposite sides of the location of welding tool or element 13′. At least the pair of rollers 63 and 64 located after the welding element, considered in the direction of movement of the plates, is rotatably driven, for example, by a motor 65 (FIG. 8) also mounted on the frame structure 60.

The vibratory tools 13′ is interposed between the surfaces of plates 40 and 41 which are to be joined and which are designated as 40′ and 41′, respectively. The vibrated tool 13′ may have rounded edges to aid the movement of the plastic plates over its upper surface 13a and lower surface 13b. The thickness T (FIG. 9) of the tool 13′ will depend upon the plastics to be joined and the rate at which the plates are moving past the stationary tool 13′. As previously mentioned, the present method of sealing or joining is not influenced by the thickness of the plastic plates in the plane perpendicular to the horizontally displaced tool 13′. If massive plastic members are to be sealed on a continuous or even intermittent basis, the tool 13 might even take the form of a blade as disclosed in U.S. Letters Patent No. 3,113,225, in which the applicant is a co-inventor. Thus, the width W (FIG. 7), as well as thickness T, of the tool will depend on the energy transfer required to cause the surfaces 40′ and 41′ to become sufficiently softened so as to bond together under the pressure being supplied by the rollers 63 and 64 which act simultaneously to transport plates 40 and 41 past the vibratory tool 13′ and act upon the plates to cause the surfaces 40′ and 41′ to be forced into intimate contact with each other after softening thereof and thus unified into one integral structure.

Since the frictional heating occurs directly at the surfaces 40′ and 41′ in the immediate vicinity of tool 13′, the force required to hold the plates under sufficient compression to permit such rapid heating by friction will vary for various plastic materials and also for the speed at which the plates 40 and 41 are moved past the stationary tool 13′.

As the plates pass the tool surfaces 13a and 13b, they are subjected to a rubbing action of high frequency and minute amplitude of vibration in a plane substantially parallel to the surface 40′ and 41′ to be joined. This rubbing action causes direct heating and softening of the surfaces 40′ and 41′ in the immediate area of the vibratory tool, so that the thickness of the plastic materials being joined is of a no consequence. Even relatively thin sheets may be bonded to thick rigid members while the outer nonjoining surfaces remain smooth and clean. Within the area between the tool 13′ and the forwardly positioned pressure rollers 63 and 64, the material begins to fuse and solidify at the joining site. The pressure rollers 63 and 64 aid the joining process by guaranteeing a homogeneous bond since they compress the plastic materials when they are in a viscous state and cause a fusion bond of the surfaces.

Application of the method embodying this invention to the sealing of thermoplastic-coated, or thermoplastic containers or cups is illustrated in FIGS. 10 and 11. With the advent of improved plastic materials, there has been an increased use of containers and cups in which the inside surfaces of the containers are provided with a waterproof or resistant plastic lining. The use of such a plastic liner creates a problem with respect to the joining or seaming of the pre-coated material, which may be paper or even metal. Where a heated sealing instrument has been used for joining or seaming plastic coated paper, it has been difficult to avoid burning or scorching of the paper.

In FIG. 10, there is shown a cup or container 70 including a cylindrical shell 81 having one of its ends closed by an end cap 72. The periphery of end cap 72 is provided with an axially directed flange portion 73 that is adapted to fit closely within the adjacent edge portion 74 of the shell for bonding thereto.

The shell 71 and end cap 72 are provided with inner coatings 75 and 76, respectively, of thermoplastic material, and there is a close tight-fitting relationship between end cap 72 and shell 71. As shown on FIG. 10, the tool 13 is urged between the plastic coatings 75 and 76, and vibrations are generated in directions substantially parallel to the plastic surfaces, as indicated by the arrow 14. After the vibratory tool 13 is inserted axially, relative motion between the tool and container 70 may be obtained by either rotating said container or, alternatively, by keeping the container stationary and moving the tool 13 around the circumference of end cap 72.

Compression means (not shown) may be provided in any conventional manner to maintain the plastic surfaces under compression after they have been softened by the vibratory energy and until a solid bond is formed therebetween.

In FIG. 11, there is shown a cup or container 77 having a cylindrical shell 78 and a circular cover or cap 79 to be secured to an end edge of the shell. The composition of either or both of the cover 79 and container 78 may be of any thermoplastic material. The vibratory tool 13 is interposed between the edge surface of shell 78 and the under surface of cap 79 in a plane substantially parallel to the surfaces to be joined and, as explained with reference to FIG. 10, relative motion, in the circumferential direction, is maintained between the tool and the surfaces to be joined during the sealing operation.

The method embodying the present invention may also be applied to the continuous sealing of thin sheet materials or films, as illustrated in FIGS. 12 through 16, which only show those portions of sealing equipment necessary to explain the method.

The sealing equipment 80 (FIG. 12) is seen to include a pair of guide rollers 81 for two continuous webs 82 and 83 of thermoplastic material. The guide rollers 81 maintain the webs taut as they pass through the sealing equipment. At the forward end of the sealing equipment is a roller 84 on which the sealed or joined plastic webs are continuously wound, as at 85. In order to effect the desired movement of the plastic webs in the direction of arrow 86, the roller 84 may be driven by an electric motor (not shown).

The plastic webs 82 and 83 may be sealed or joined together either along one edge or along both edges. At each edge to be sealed there is provided a mechanical vibratory tool 13', as previously described with reference to FIGS. 8 and 9, disposed with its longitudinal axis extending laterally so that the vibrations at the free end portion of tool 13' are directed in a horizontal plane or in a plane parallel to the surfaces to be sealed. The webs 82 and 83 are made to pass above and below the welding tool or tools 13' by pairs of upper and lower rollers 87 and 88, respectively, engageable, from above and below, with the plastic webs to be sealed. At least one pair of rollers 87 and 88 is located before sealing tool or tools 13' and another pair of rollers 87 and 88 is located after the sealing tool.

As in the bonding of relatively thick members previously described with reference to FIGS. 8 and 9, the rubbing action of the vibratory tool 13' occurs only at the surfaces of the webs or films which are to be joined, and, again, both friction and shear wave absorption cooperate to keep the surfaces to be joined in a softened state. When the plastic webs 82 and 83 are very thin, for example, have a thickness in the range of .001 to .020 inch, it is important that the pressure applying rollers 87 and 88 located after the tool or tools 13', when considered in the direction of movement of the webs, be of thermally conducting materials so as to bleed-off the heat energy.

The pair of rollers 87 and 88 positioned before the vibratory tool or tools 13' act primarily as tensioning means to maintain the plastic sheets 82 and 83 taut as they pass the tool or tools. The rollers 87 and 88 located after the vibratory tool or tools 13', are positioned relative to each other so as to act as compression rollers for effectively pinching the softened surfaces into intimate contact with each other. The pressure rollers 87 and 88 are preferably constructed or coated with a material which will tend to remove heat effectively at a proper rate from the interface of the plastic webs or films and thereby enhance the cooling and solidifying process. This is important in that, although it is desirable to retain all the softening energy at the plastic film surface during softening, nevertheless, after softening, it is advantageous to rapidly restore the film to room temperature so as to maintain the strength of the film. This is an important practical consideration when the film is thin, and it is desired to seal it at a high speed. The upper limit of speed is essentially determined by the strength of the film at its weakest moment. The film experiences its weakest moment when it is softened and it is preferable to keep this moment as brief as possible and yet produce the softening necessary for joining the webs or films.

However, if pressure rollers are positioned immediately above and below the vibratory tool or tools 13', such rollers should be of a non-conducting material so as to avoid too rapid bleeding-off of the heat energy as it is being generated. By maintaining the heat at the surfaces of the plastic webs or films to be sealed, it is possible to obtain a uniform continuous seal with a small powered tool.

As is apparent from FIG. 14, the width of the seal may be varied by changing the depth of insertion of vibratory tool 13' between the plastic webs 82 and 83. Each tool 13' may have an oval cross-section, as shown on FIG. 13, to facilitate movement of plastic webs 82 and 83 which are in frictional engagement with the vibratory tool or tools.

It should be pointed out that, although there must be frictional contact between the vibratory element and the surfaces to be joined, the friction reduction phenomena associated with a tool vibrated in the ultrasonic range is still present. By this, it is mean that, by the reason of the vibrations in the horizontal plane or in the plane parallel to the surfaces to be joined, the frictional resistance of the sealing tool or tools 13' to movement of the webs 82 and 83 is very substantially reduced. Thus, a minimum force is required to obtain relative movement of the tool and webs or other objects to be sealed.

The method embodying the present invention may also be employed for simultaneously sealing more than two layers of thermoplastic material. Multi-layer walls of plastic sheet material are often provided in heavy duty plastic bags for powders or liquids. If one layer of the wall of such a bag is ripped, the other layers still act to confine the powder or liquid substance contained therein.

The sealing of more than two layers or webs or thermoplastic material is illustrated on FIGS. 15 and 16. The three layers to be sealed 82', 90 and 83' are supplied from suitable rolls and are simultaneously moved past a vibratory tool 93. Although the layers 82', 90 and 83' are all illustrated as being of flexible sheet-like material, it is apparent that the method illustrated by FIGS. 15 and 16 may be utilized to simultaneously seal thick, rigid members, or any combination of thin and thick members. Further, the members secured to each other may all be of plastic materials, or partly of plastic and partly of metal or other thermosoftening material.

As shown on FIG. 16, the tool 93 used to accomplish the sealing has a pair of tines 94, each of which is interposed between two of the webs or sheets to be sealed. It will be apparent that the upper tine 94 of tool 93 effects rubbing contact with the confronting surfaces of webs 82' and 90, while the lower tine 94 of tool 93 effects simultaneous rubbing contact with the confronting surfaces of webs 83' and 90. The tool 93 can be balanced so that the vibrations at the contacting surfaces of its tines 94 are substantially longitudinal, as indicated by arrow 14. The size and position of the tines 94 can be varied to change the ratio of longitudinal motion to transverse motion at the tool surfaces.

As in the arrangement described above with reference to FIGS. 12, 13 and 14, a pair of upper and lower tensioning rollers 87' and 88' is positioned ahead of the vibratory tool 93 and at least another pair of rollers 87' and 88' is located after the tool 94.

The application of this invention to the closing of plastic bags is illustrated in FIGS. 17, 18 and 19. These plastic bags may be of a multi-layer wall construction or of single layer wall construction, as in the drawings. The bag 95 to be closed or sealed is of a thermoplastic material having two sides 96.

The bag 95 may be supported during the filling and sealing operations by clamps 97 which are, in turn, carried by a conveyor mechanism (not shown) of any conventional type that is not part of the present invention. The bag 95 may be moved past a stationary sealing station at speeds from 10 to 60 f.p.m., or alternatively, the bag may be momentarily stopped at such station to permit movement of a vibratory assembly 15 and its tool 13' across the upper mouth surfaces of the bag 95 for sealing the mouth or upper end of the bag. The methods described above with reference to the sealing of plates and webs in FIGS. 8 through 16, are applicable to the sealing of bags as well. If multi-wall bags are to be sealed, then a tool similar to the tool 93 of FIGS. 15 and 16 may be utilized.

The vibratory assembly 15 is non-rotatably mounted so that it is disposed with its longitudinal axis extending perpendicular to the direction of movement of the conveyed bag 95. The vibratory tool 13' extending from the vibratory assembly 15 is interposed between the surfaces of the walls 96 to be sealed and a pair of compression rollers 98 are positioned after the tool 13' so as to effectively hold together the softened surfaces of the plastic side walls. In this manner, it is possible to easily seal bags of a thermoplastic material by the use of low-powered, small vibratory tools.

The method embodying this invention may also be applied to butt welding the ends of thermosoftening pipe sections. As shown in FIGS. 20 and 21, the end surfaces 102 and 103 of pipe sections 100 and 101, respectively, are butted together by a force being applied in the direction of the arrows F on FIG. 21. The mechanical vibratory assembly 15 is positioned so that it is disposed with its longitudinal axis extending parallel to the surfaces 102 and 103 to be sealed. The vibratory tool 13' of assembly 15 is interposed between surfaces 102 and 103 and longitudinally vibrated in the direction of arrow 14.

Relative motion between the vibratory assembly 15 and the pipe sections 100 and 101 may be obtained by either maintaining the pipes in fixed position and moving the vibrator assembly 15 circumferentially around the pipe sections, or, alternatively, by rotating pipe sections 100 and 101 while maintaining the vibrator assembly 15 in fixed position. The pressure required to maintain the softened edges 102 and 103 of the pipe sections 100 and 103 in contact with each other until such edges solidify is supplied by the force F.

Figure 6:
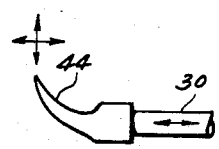
FIG. 6 is a view similar to that of FIG. 5, but showing another form of tool.

The method of plastic welding disclosed herein may also be utilized for the joining together of members that, because of their size and configuration, do not permit the vibratory assembly 15 to be disposed with its axis lying in a plane parallel to the surfaces to be secured to each other. For example, FIGS. 22 and 23 illustrate the joining of a tubular hollow member 105 of square cross-section to a thick wall thermoplastic member 106. In view of the size of the members to be secured together, it may not be necessary to secure them together around the entire periphery of the surfaces being joined. Thus, in FIG. 22, a series of spot welds 107 are shown around the periphery of the hollow member 105. To accomplish this sealing operation, the vibratory assembly 15 is provided with a tool 44 having a bent tip, as shown particularly on FIG. 6. The tip of this tool is designed so that its vibratory motion has two components resulting in elliptical motion at the tip. The tip is bent for two reasons: first, it permits the user to obtain easy access to the surfaces to be joined as is apparent on FIG. 23; and secondly, the two components of motion cooperate to heat the plastic surfaces at a localized area and effectively cause a flow of plastic to form a given spot weld. With the arrangement of the thermoplastic members 105 and 106 as shown on FIG. 23, that is, with the member 105 fitting closely in an opening in member 106, it is not necessary to supply positive pressure for holding the parts together during the sealing operation. Further, when the parts to be joined are relatively large size, additional means are not required for holding their surfaces in contact during the sealing operation.

Tubular members may also be longitudinally seamed or sealed on a continuous basis by utilizing the method embodying this invention. Referring to FIG. 24, it will be seen that the thermoplastic tube 110 to be longitudinally seamed is moved in the direction of the arrow 111. At opposite sides of the tube, in the vicinity of the joining zone, are two pair of pressure rollers 112 and 113 which engage opposite sides of the tubing so that the longitudinal edge surfaces 114 and 115 are firmly brought together before and after they are subjected to ultra-sonic vibrations. In the region between the pairs of rollers 112 and 113, a vibratory tool 13' is disposed so as to enter between, and be intimate contact with the edge surfaces 114 and 115 of the plastic tubing. It will be apparent that, as the surfaces 114 and 115 pass the vibratory tool 13', they are sufficiently softened so that, when they are immediately thereafter forced into intimate contact with each other by the second pair of pressure rollers 113, the surfaces form a secure bond therebetween.

The method embodying the present invention may also be applied to the sealing of members of substantial length by the utilization of blade-like tools, as disclosed in detail in U.S. Letters Patent No. 3,113,225, FIG. 25 generally illustrates the sealing of members 122 and 123 of substantial length through the use of such a blade-like member 120.

In order to illustrate the important features of this type of sealing most clearly, details, such as, the supports for the blade 120 and for the sheet-like members 122 and 123 are not shown. The sealing or joining of sheets 122 and 123 is accomplished by insertion of the output edge 121 of blade 120 between the two sheets 122 and 123 of thermoplastic material. The edge 121 of blade 120 has a component of vibration in the plane parallel to the surfaces to be joined, as indicated by the arrow 124.

The blade 120 may be interposed between the surfaces to be joined by movement of the blade in the general direction of arrow 125. After a sufficient amount of vibratory energy has been transferred to the surfaces to be joined and said surfaces become soft and tacky, the blade 120 is withdrawn from between the surfaces to be joined. A pair of pressure rollers 126 and 127 are rotatably mounted for movement from the illustrated positions to positions adjacent the edges of sheets 122 and 123 where the rollers apply a positive pressure for holding the previously softened surfaces in intimate contact with each other until they have again solidified to form a secure bond.

The butt welding of pipe sections in accordance with this invention may also be carried out with a vibratory device 15 as illustrated in FIG. 26. Such a device 15 has a radial flange 132 extending from its body 131 and which vibrates in a radial mode. This flange 132 is interposed between the two pipe sections 133 and 134 to be joined, and either the pipe sections are held stationary and the device 15 is moved in a circular path around the pipe sections, or the vibratory device 15 is held stationary and the pipe sections are rotated to accomplish the same end result.

It will be appreciated that the essence of the present invention consists in applying high frequency, minute amplitude vibrations with a major rubbing component to the inner or confronting adjacent surfaces of two or more bodies, at least one of which is of a thermosoftening material, thereby softening said adjacent surfaces, and then holding together these surfaces until permanent joining is effected. From the foregoing it is apparent that the manner in which the vibrations are generated in the tool is of practical, but nonetheless secondary, importance. Although most of the embodiments of the invention described above employ an elongated, thin spatula-like element as the tool which is vibrated chiefly in the plane of the spatula surface, and such vibrations are induced chiefly through the use of longitudinal vibrations initiated in a transducer and transmitted along a longitudinally vibrating transmission line, other arrangements for vibrating the tool, and other tool configurations have been successfully employed. Thus, flexural vibrators, radial vibrators and blade-like elements of elongated character requiring blade tool-holders of the type described in U.S. Letters Patent No. 3,088,343 have been used. The type of vibrations and vibrator selected for any industrial application of the invention will depend on the type of joining problem to be solved. For example, joining small parts of toy models demands a small, easily manipulated, hand-held device. On the other hand, if one desires to join two sheets of plate glass, as in the manufacture of insulating glass, such as that generally known as Thermopane, a machine driven vibrator of the elongated blade type is to be preferred.

Although illustrative embodiments of the invention have been described in detail herein with reference to the accompanying drawing, it is to be understood that the invention is not limited to those precise embodiments, and that various changes and modifications may be effected therein by one skilled in the art without departing from the scope or spirit of the invention, except as defined in the appended claims.

What is claimed is:

1. A method of joining normally solid materials, at least one of which is thermosoftening and a poor transmitter for shear vibrations, comprising placing surfaces of the materials to be joined in close proximity to each other, interposing between said surfaces, and in contact with the latter at a joining zone, a tool member which is vibrated at a high frequency and with a small amplitude in directions having major components parallel with said surfaces at said joining zone, thereby exerting a rubbing action for heating the surfaces at the joining zone and hence softening the thermosoftening material substantially only at the respective surface in said zone, withdrawing the vibrated tool member from between said surfaces where the material has been softened, and pressing together the surfaces where the material has been softened until the softened material again solidifies to provide a firm bond between the surfaces.

2. A method of joining at least two members at surfaces thereof defined by thermosoftening materials which are poor transmitters of shear vibrations, comprising disposing the members with said surfaces thereof in closely proximate relation, interposing between said surfaces, and in simultaneous contact with the latter at a joining zone, a tool which is vibrated at a high frequency and with a small amplitude in directions having major components parallel with said surfaces at said joining zone, thereby exerting a rubbing action for heating the surfaces and softening the thermosoftening material substantially only at said surface in the joining zone, effecting relative movement of said tool and said members so as to withdraw the tool from between the softened surfaces, and pressing together the softened surfaces until the thermoplastic material thereof again solidifies to form a firm bond between said members.

3. A method as in claim 2; wherein said tool is at a fixed location, and said members are moved past said location in a direction lying within a plane containing said surfaces at which the members are to be joined.

4. A method as in claim 2; wherein said members are held stationary, and said tool is moved in a direction lying within a plane containing said surfaces at which the members are to be joined.

5. A method as in claim 2; further comprising conducting heat away from said surfaces when the latter are pressed together following the softening thereof, thereby to accelerate the solidifying of the surfaces.

6. A method of joining thermosoftening members which are poor transmitters of shear vibrations, comprising disposing said members with surfaces thereof in confronting, closely proximate relation, interposing between said surfaces a tool having opposed operative faces in contact with said surfaces, effecting high frequency vibration of said tool at said faces in directions substantially parallel to said surfaces so as to exert a rubbing action on the latter for heating and softening the thermosoftening members substantially only at the contacted surfaces thereof, moving said members and tool relative to each other so as to withdraw said tool from between the softened surfaces, and pressing together the softened surfaces until the thermosoftening material thereof solidifies again to form a firm bond between the members.

7. A method as in claim 6; wherein said thermosoftening members are sheet-like.

8. A method as in claim 6; wherein said thermosoftening members are relatively thick in directions perpendicular to said surfaces.

9. A method as in claim 6; wherein said thermosoftening members are tubular and said surfaces are located at the end edges of the tubular members.

10. A method of joining together the opposite longitudinal edges of thermosoftening sheet material which is a poor transmitter of shear vibrations so as to form a tube therefrom, comprising disposing said opposite longitudinal edges in surface abutting relation, interposing between said abutting longitudinal edges surfaces a tool having opposed operative faces in contact with said edges, effecting high frequency vibration of said tool at said faces in directions substantially parallel to the edge surfaces of the thermosoftening material so as to exert a rubbing action on the latter for heating and softening the same substantially only at the contacted surfaces, moving said tool and thermoplastic material relative to each other in the direction along said abutting edges so as to progressively displace the site at which said edges are softened, and pressing together the softened edge surfaces until the thermosoftening material thereof solidifies again to form a firm bond between the edges.

11. A method of joining together the end edge surfaces of tubes of thermosoftening materials which are poor transmitters of shear vibrations, comprising disposing said tubes with said end edge surfaces thereof in abutting relation, interposing between said abutting end edge surfaces a tool having opposed operative faces in contact with said edge surfaces at limited areas of the latter, effecting high frequency vibration of said tool at said faces in directions substantially parallel to said edge surfaces so as to exert a rubbing action on the latter for heating and softening the same substantially only at said limited areas of contact, moving said tool and tubes relative to each other in the circumferential direction of said tubes so that said tool progressively contacts all of said end edge surfaces, and urging said tubes axially toward each other so that, as said end edge surfaces are progressively softened at the limited areas of contact with said tool, the softened areas are pressed against each other to resolidify and form a secure bond therebetween.

12. A method as in claim 11; wherein said tool is spatula-like in configuration and directed generally radially between said end edge surfaces of the tubes, and said vibrations are directed substantially in the longitudinal direction along said spatula-like tool.

13. A method as in claim 11; wherein said tool is of circular configuration, and said vibrations are directed radially with respect to said circular tool.

14. A method of joining sheet-like thermosoftening members along an edge thereof comprising disposing said members with surfaces thereof in confronting, close proximity along an edge thereof, inserting between said confronting surfaces a blade-like tool extending substantially along said edge, vibrating said blade-like tool at a high frequency and small amplitude in directions substantially parallel to said surfaces for exerting a rubbing action on the latter and thereby heating and softening said members substantially only at said surfaces, withdrawing said blade-like tool from between said softened surfaces, and pressing the softened surfaces against each other until the same solidify and form a secure bond.

15. Apparatus for joining members of thermosoftening material, comprising means holding the members to be joined with surfaces thereof in confronting, close proximity to each other, a tool projecting between the confronting surfaces and having opposed operative faces contacting the surfaces, means effecting high frequency vibration of said tool at said faces in directions substantially parallel to the planes of said faces so that the latter produce a rubbing action on the contacted surfaces of the members to be joined for heating and softening said members substantially only at the areas of contact of said surfaces the latter with said tool, means effecting relative movement of said tool and the members to be joined so that the tool is moved out of contact with the softened areas of the confronting surfaces, and means acting on the members and operative to press together the softened areas of the surfaces upon relative movement of said tool out of contact therewith so that said softened areas solidify and form a firm bond therebetween.

16. Apparatus for joining thermosoftening, sheet-like members comprising spaced apart pairs of rollers rotatable about parallel axes and engageable with the members to be joined from the opposite sides of such members for urging confronting surfaces of the latter toward each other, at least one tool located intermediate said spaced apart pairs of rollers and extending between the confronting surfaces of the members to be joined, said tool having opposed operative faces engageable with said confronting surfaces, means effecting high frequency vibration of said tool at said faces thereof in planes substantially parallel to the latter so as to exert a rubbing action on the contacted surfaces for heating and softening the sheet-like members substantially only at said contacted surfaces thereof, and means effecting relative displacement of said members to be joined with respect to said tool and rollers in a direction perpendicular to the axes of rotation of the latter so that the rollers following said tool, considered in the direction of said relative displacement, serve to press together the softened surfaces until the latter solidify and provide a firm bond between the members.

17. Apparatus as in claim 15; wherein said means effecting relative displacement of the members to be joined with respect to the tool and rollers includes motor means driving at least some of said rollers.

18. Apparatus as in claim 16; wherein said tool has at least two parallel, connected tines vibrated simultaneously in the longitudinal direction thereof and each extending between two sheet-like members to be joined so that more than two members can be simultaneously joined to each other.

References Cited

UNITED STATES PATENTS

| | | | |
|---|---|---|---|
| 2,983,306 | 5/1961 | Resnick | 156—380 |
| 3,022,814 | 2/1962 | Bodine | 156—73 |
| 3,121,353 | 2/1964 | Scarpa et al. | 228—1 |
| 3,184,353 | 5/1965 | Balamuth et al. | 156—73 |
| 3,219,742 | 11/1965 | Reinert | 156—306 |

EARL M. BERGERT, *Primary Examiner.*

W. E. HOAG, *Assistant Examiner.*